United States Patent Office 3,597,278
Patented Aug. 3, 1971

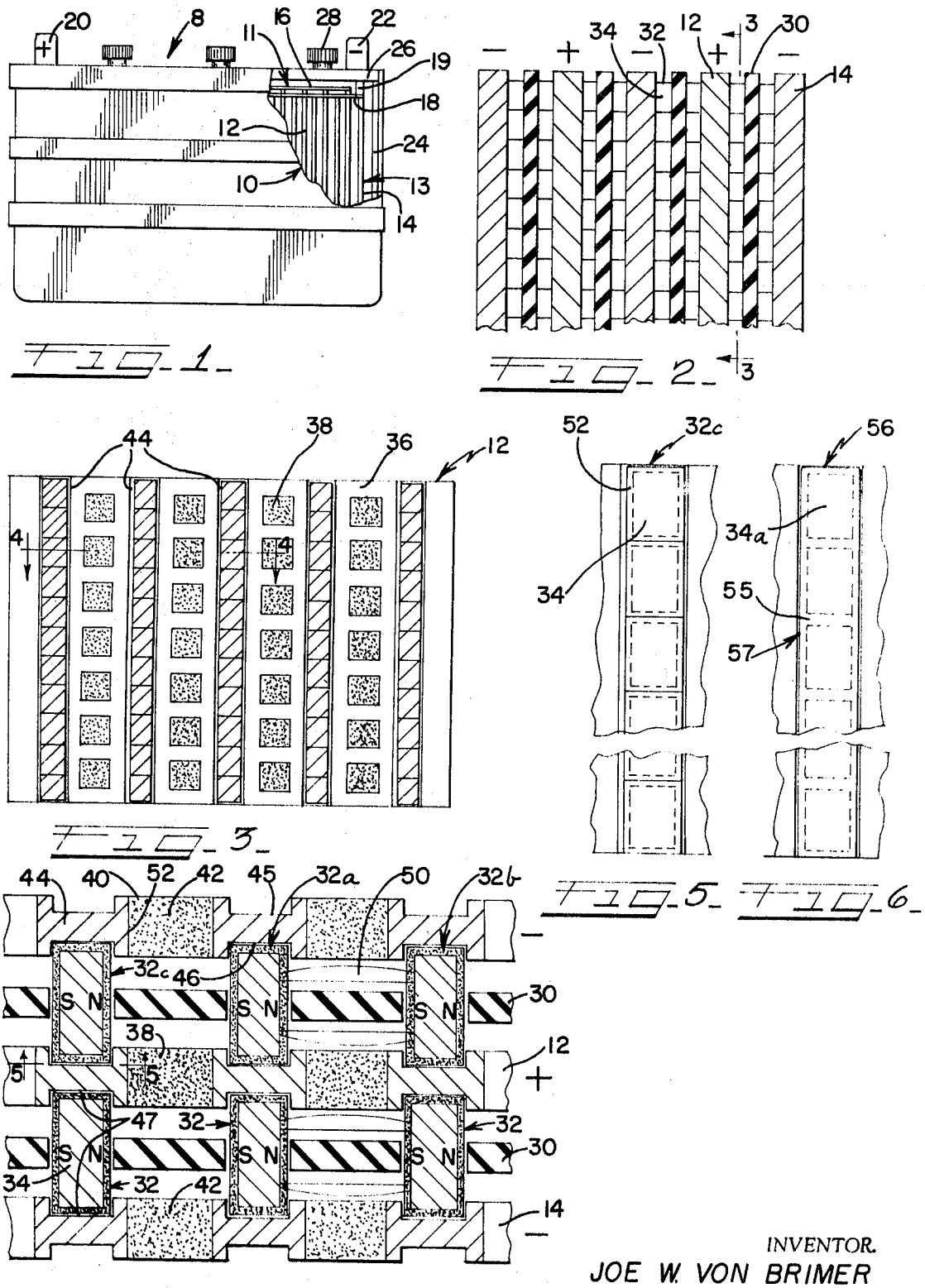

3,597,278
ELECTROLYTIC CELL COMPRISING MEANS FOR CREATING A MAGNETIC FIELD WITHIN THE CELL
Joe W. Von Brimer, 3177 S. Highland Drive, Las Vegas, Nev. 89102
Filed Nov. 15, 1968, Ser. No. 776,120
Int. Cl. H01m 11/00, 15/00
U.S. Cl. 136—136                                  8 Claims

ABSTRACT OF THE DISCLOSURE

An electrolytic cell comprising a positive electrode and a negative electrode, an electrolyte in association with said electrodes, and means for creating a magnetic field within the cell for circulating the electrolyte when current is flowing between the electrodes. One disclosed form includes permanent magnets extending between the plates forming the cell electrodes, to establish lines of flux extending generally parallel to the plates and serving to maintain the plates in a spaced apart relation.

BACKGROUND OF THE INVENTION

(1) Field of the invention

In general, the field of the invention is that of electrolytic cells. More particularly, the field of the invention is that of electrolytic cells having means therein, or associating therewith, for circulating the electrolyte in the cell when current is flowing between electrodes in the cell. In one aspect, the field is also that of batteries which include permanent magnets therein extending between the plates of the cell electrodes, and establishing a magnetic field which acts on the electrolyte to circulate it through the cell, not only for cooling, but also for maintaining uniform distribution of the electrolyte to prevent localized depletion of active materials therein.

(2) Description of the prior art

In a typical prior art electrolytic cell or battery, when current is flowing between the electrode therein, molecules of the electrolyte, typically a dilute aqueous solution of acid, ionize to form negative and positive ions. For example, in prior art lead-acid batteries, the negative sulfate ion reacts with metallic lead to form lead sulfate, which is deposited on both the negative and positive plates of the cell electrodes. Because of this reaction, which takes place in the region which is physically immediately adjacent the plates, the concentration of the electrolyte at different points in the region between the plates will vary. Also, the concentration of the electrolyte in the cell will be lower in the region or area between the plates than in other portions of the cell. This lack of uniformity of the concentration of electrolyte in the cell is disadvantageous to the operation of the cell, since it increases the internal resistance of the cell, thereby reducing the power output capability of the cell. To overcome this disadvantage, it is known to attempt to circulate the electrolyte mechanically in the cell to provide a more uniform concentration of the electrolyte through the cell and provide increased cooling of the electrolyte and electrodes. As a result, in large stationary batteries, means have been provided, usually in the form of a pump, for circulating the electrolyte. However, in a small battery the cost of providing an effective circulating pump outweighs the advantages of improved operation of the battery gained by circulating the electrolyte.

SUMMARY OF THE INVENTION

In view of the advantages obtained by circulating the electrolyte in an electrolytic cell, it is an object of this invention to provide a simple, effective and economically feasible means for circulating such electrolyte.

Another object of this invention is to provide means for establishing a magnetic field within an electrolytic cell for circulating the electrolyte therein when current is flowing between the electrodes in the cell.

A further object of this invention is to provide permanent magnets within an electrolytic cell between the plates forming the electrodes of the cell or battery for circulating electrolyte in the cell when current is flowing between the electrodes.

A still further object of this invention is to provide means for establishing a magnetic field within an electrolytic cell for circulating the electrolyte when current is flowing between the electrodes in the cell and arranging the means for establishing the magnetic field between the plates forming the electrodes in order to space and maintain the plates a fixed distance apart.

The present invention achieves its objects, and other objects and advantages, including those inherent therein, by providing an electrolytic cell comprising spaced electrode means, an electrolyte, and means for establishing a magnetic field within the cell for circulating the electrolyte when current is flowing between the electrode means.

BRIEF DESCRIPTION OF THE DRAWINGS

FIG. 1 is a side elevational view, with portions broken away, of a storage battery made in accordance with the present invention.

FIG. 2 is an enlarged sectional view of a portion of the battery of FIG. 1 showing the positive and negative plates forming the electrodes of an electrolytic cell, with magnets disposed therebetween.

FIG. 3 is a sectional view taken along lines 3—3 of FIG. 2.

FIG. 4 is a sectional view taken along lines 4—4 of FIG. 3.

FIG. 5 is a sectional view, taken along lines 5—5 of FIG. 4, showing a side elevational view of a column of permanent magnets.

FIG. 6 is a similar view to FIG. 5, showing the permanent magnets encased in an insulating material to form a bar of magnets.

DESCRIPTION OF THE PREFERRED EMBODIMENTS OF THE INVENTION

A battery, such as a conventional lead-acid storage battery is generally indicated at 8 in FIG. 1. The battery 8 comprises a number of cells 10. Each cell 10 contains a positive electrode 11 comprising a plurality of plates 12 and a negative electrode 13 comprising a plurality of plates 14. The plates 12 and 14 are arranged parallel to each other with alternate polarities thereon, i.e. negative, positive, negative, etc. All the positive plates 12 of one cell are connected together by an alloy strap 16 and all the negative plates are likewise connected together by an alloy strap 18. Each strap has a connecting lug 19 for connecting the electrodes into an external circuit. The connecting lugs 19 of the cells are connected in series circuit relationship between a positive terminal 20 at one end of the battery 8 and a negative terminal 22 at the other end of the battery 8, terminals 20 and 22 being adapted for connecting the battery into an external circuit.

Each cell includes a jar or container 24. The plates 12 and 14 are suspended into the container 24 by the straps 16 and 18 to maintain the bottom edges of the plates 12 and 14 above the bottom of container 24 and thereby prevent short-circuiting of the plates from material which may accumulate at the bottom of container 24 or from buckling of the plates which can occur if the plates were supported on the bottom of the container 24. The positive and negative plates 12 and 14 will be short circuited if they come in contact with each other and are prevented from doing so by separators 30 disposed between the plates 12 and 14.

In a preferred embodiment of the present invention, columns 32 of permanent magnets 34 are also disposed between the plates 12 and 14 in addition to, or in place of, conventional separators 30.

Each of the plates 12 comprises a grid 36 which is filled with a "paste" of active material 38. Likewise each plate 14 comprises a grid 40 filled with a "paste" of actvie material 42. In a preferred embodiment of the present invention each plate 12 and 14 includes a plurality of grid posts 44 as shown in FIGS. 3 and 4. Each grid post 44 has a generally H-shaped cross-section so as to provide elongated notches 45 and 46 on each side of each post 44. The notches 45 on one side of one plate are aligned with notches 46 on an adjacent plate so as to form a slot 47 between separated plates. These slots 47 are designed to receive the columns 32 of permanent magnets 34 for maintaining the columns of magnets parallel to each other a fixed distance apart. The magnets 34 in each column 32 are aligned so that all north poles are on one side of the column and all south poles are on the opposite side of the column (FIG. 4). The columns are then arranged so that all the north poles on one side of one column, such as column 32a, face the south poles on an adjacent one of the columns, such as column 32b, whereby a magnetic field is established between adjacent parallel spaced columns 32a, 32b. The lines of flux of the magnetic field, generally indicated at 50 in FIG. 4, extend from the north poles to the south poles generally parallel to the plates 12 and 14. With this arrangement a force is exerted on the ions moving in the region between positive and negative plates 12 and 14 when a current is flowing between the electrodes 11 and 13 such as upon charging or discharging of the cell.

Preferably each magnet 34 is coated with an insulating material which is imprevious to the electrolyte. This coating is generally indicated at 52 in FIGS. 4 and 5. Preferably the permanent magnets are ceramic magnets. As pointed out previously, the magnets 34 are stacked one upon another in a series of columns 32 such as column 32c in FIG. 5.

In another embodiment, each column of magnets can be encased in an impervious material 55 to form a bar 57 such as magnets 34a in column 56 as shown in FIG. 6. In some cases encasing the magnets 34a in an insulating material 55 to form bars 57 facilitates construction of a battery according to the teachings of this invention.

In a 6-volt lead-acid storage battery there are three cells, a typical cell comprising fifteen plates, seven positive plates 12 and eight negative plates 14. The separators 30 are usually in sheet form and are commonly made of wood, rubber, glass or plastic. In most cases the separators 30 are microporous to permit the electrolyte to permeate them.

In a typical lead-acid battery, the active material 38 filling the grid 40 of each positive plate 12 is a lead peroxide or lead dioxide ($PbO_2$) "paste." The active material 42 filling the grid 40 of each negative plate is metallic "sponge" lead. The electrolyte is a dilute aqueous solution of sulfuric acid.

Referring now to the operation of the cell, when the cell is discharging the following reactions take place. At the negative eletrode 13 the electrolyte solution pressure causes the negative plates 14 to throw lead ions into solution, i.e. divalent lead ions. Coincident with the departure of each of the positive lead ions from the surface of each plate 14 the negative electrode 13 acquires two negative charges, i.e. two electrons which go into the external circuit. The lead ions react with the sulfate ions to form lead sulfate which precipitates out of solution and deposits on the negative plates 14. According to one theory, a small percent of the lead peroxide of the positive plates 12, in combination with water, ionizes into tetravalent lead ions and monovalent hydroxyl ions. The current producing process is associated with potential differences at the electrodes 11 and 13 that depend, first, on the equilibrium potentials for the ionic reactions, and second, on the ionic concentration. At the positive electrode 11 the ionic reaction of a tetravalent lead ion plus two electrons from the external circuit forms a divalent lead ion. Then the divalent lead ions combine with the sulfate ions to form lead sulfate which precipitates out of solution and deposits on the positive plates 12. In the electrolyte, the sulfuric acid ionizes into two hydrogen ions and one sulfate ion. The hydrogen ions combine with the hydroxyl ions to form water. The net chemical change in the cell is the formation of lead sulfate on the plates 12 and 14 of each electrode 11 and 13 and the addition of water, formed as a reaction product, to the electrolyte solution.

When the battery is discharging electrons are flowing in the external circuit from the negative terminal 22 to the positive terminal 20. As pointed out above, the ions will move in the electrolyte in the area adjacent each plate 12 and 14, and the sulfate ions will combine with divalent lead ions to form lead sulfate. As a result there will be localized depletion of sulfate ions in the region between the plates 12 and 14.

To prevent localized depletion of sulfate ions, the present invention utilizes a magnetic field to circulate the electrolyte. Although the reasons for the success of the invention are not known with certainty, and the invention is not intended to be limited to any one theory, or mode of operation, it is though that, when current is flowing into or out of the cells during charging or discharging of the battery, the positive and negative ions in the electrolyte solution will move in the area or region adjacent the plates under the influence of electric fields established by the concentration of negatively charged particles in some areas and of positively charged particles in other areas, e.g. at the plates 12 and 14. When the ions move in a direction transverse to the lines of flux of the magnetic field, an electromagnetic force is exerted on the ions. It is believed that this electromagnetic force on the ions circulates the electrolyte between and around the plates 12 and 14 thereby cooling the electrolyte and plates 12 and 14, and also providing a more uniform concentration of electrolyte in the cell, particularly in the region or space between adjacent plates 12 and 14.

Although the invention has been described with reference to a conventional lead-acid storage battery, the invention can be practiced with other types of batteries which utilize metallic or non-metallic electrodes and which utilize different types of electrolyte.

Since the columns 32 of magnets 34 space and maintain the plates 12 and 14 a fixed distance apart the separators 30 can be eliminated and only the columns 32 will then be employed as separating means to prevent a short circuit between adjacent plates.

If desired, the columns 32 can be formed with one or more open spaces so that the electrolyte can circulate between the regions or spaces formed between the series of columns 32 between adjacent plates 12 and 14.

In the illustrated embodiment the magnets are disposed between the plates 12 and 14. However, the magnets 34 can be positioned outside of the plates, inside or outside of the cell, to establish a magnetic field in the region between adjacent plates 12 and 14.

Permanent magnets 34 are utilized in the illustrated embodiment since they require no maintenance or upkeep. Also, they provide means for maintaining the plates a fixed distance apart and can be used for this purpose in place of separators 30. However, other means, such as a coil of wire energized by an electric current or an electromagnet, can be utilized to establish the magnetic field in the region between adjacent plates 12 and 14.

I claim:

1. An electrolytic cell comprising a plurality of parallel, spaced apart plates, an electrolyte, and a plurality of permanent magnets arranged in a series of columns extending between adjacent plates, said magnets in each of said columns being aligned so that all north poles are on one side of each of said columns and all south poles are on the opposite side of each of said columns, said columns being disposed in a parallel spaced apart relationship to one another, whereby the north and south poles respectively on one of said columns face respectively the corresponding south and north poles on adjacent columns to establish a magnetic field between said adjacent columns generally parallel to said plates for circulating said electrolyte when current is flowing between said plates.

2. An electrolytic cell as set forth in claim 1 wherein each of said plates includes a plurality of elongated grid posts spaced therealong in parallel relationship to each other, each of said grid posts having a generally H-shaped cross-section so as to provide elongated notches on each side of each of said plates, wherein said notches on one plate are aligned with said notches on adjacent ones of said parallel spaced plates to form slots between said plates for receiving said columns of permanent magnets and for maintaining said columns of magnets parallel to each other a fixed distance apart, and wherein said columns of magnets serve to maintain said parallel spaced plates a fixed distance apart.

3. An electrolytic cell as set forth in claim 1 wherein said magnets are encased in an insulating material which is impervious to said electrolyte.

4. An electrolytic cell as set forth in claim 1 wherein each of said columns of said magnets is encased in an insulating material which is impervious to said electrolyte whereby each of said columns is in the form of a generally vertically extending bar.

5. An electrolytic cell comprising a plurality of parallel, spaced apart, alternately arranged, positive and negative plates, an electrolyte, and a plurality of permanent magnets fixed within said cell between said plates for circulating said electrolyte when current is flowing between said plates and for maintaining said plates spaced apart a fixed distance.

6. An electrolytic cell as set forth in claim 5 wherein said permanent magnets are ceramic magnets.

7. An electrolytic cell as set forth in claim 5 wherein said plates are metallic.

8. In combination at least two of said electrolytic cells as set forth in claim 5, connected together to form a battery.

References Cited

UNITED STATES PATENTS

| | | | |
|---|---|---|---|
| 1,658,872 | 2/1928 | Yeager | 204—309 |
| 1,902,384 | 3/1933 | Steinbuch et al. | 204—311X |
| 3,083,253 | 3/1963 | Sundberg | 136—160 |
| 3,266,943 | 8/1966 | Goldner | 136—86X |
| 3,409,471 | 11/1968 | Sturm et al. | 136—86 |

WINSTON A. DOUGLAS, Primary Examiner

A. SKAPARS, Assistant Examiner

U.S. Cl. X.R.

136—160; 204—273, 309